United States Patent [19]
Nakata

[11] Patent Number: 4,777,662
[45] Date of Patent: Oct. 11, 1988

[54] OPTICAL COMMUNICATION PROCESS

[75] Inventor: Shinichi Nakata, Kawasaki, Japan

[73] Assignee: Canon Kabushiki Kaisha, Tokyo, Japan

[21] Appl. No.: 56,277

[22] Filed: May 26, 1987

Related U.S. Application Data

[63] Continuation of Ser. No. 566,553, Dec. 29, 1983, abandoned.

[30] Foreign Application Priority Data

Jan. 12, 1983 [JP] Japan .................................. 58-2258

[51] Int. Cl.[4] ............................................. H04B 9/00
[52] U.S. Cl. ...................................... 455/607; 371/24; 455/78; 455/601; 455/617
[58] Field of Search ................. 455/606, 607, 612, 69, 455/78, 601, 617; 370/15, 16, 24, 32, 94 U; 371/24; 340/825.05; 379/5

[56] References Cited

U.S. PATENT DOCUMENTS 4,063,220 12/1977 Metcalfe et al. ................. 340/825.5

Primary Examiner—Robert L. Griffin
Assistant Examiner—Leslie Van Beek
Attorney, Agent, or Firm—Fitzpatrick, Cella, Harper & Scinto

[57] ABSTRACT

An optical communication processs is capable of avoiding errors resulting from stray reflection of the transmitted optical signals. For this purpose, the optical receptor of an apparatus is disabled during the transmission of optical signals from the optical transmitter of this apparatus.

4 Claims, 4 Drawing Sheets

(a)

(b)

(c)

(d)

(e)

4,777,662

OPTICAL COMMUNICATION PROCESS

This application is a continuation of application Ser. No. 566,553 filed Dec. 29, 1983 now abandoned.

BACKGROUND OF THE INVENTION

1. Field of the Invention

The present invention relates to an optical communication process for use in an apparatus for optical communication.

2. Description of the Prior Art

In conventional optical communication apparatus, erroneous operations are often encountered because the emitted light is undesirably reflected by an obstacle such as a wall and is received by the optical receptor of the emitting apparatus. Also there has been no satisfactory confirmation whether the transmitted data are correctly received at the destination.

SUMMARY OF THE INVENTION

In consideration of the foregoing, an object of the present invention is to provide an optical communication process which is not associated with the aforementioned drawback and is capable of secure data transmission to the destination and of reducing errors in the transmission, by invalidating the data received by the optical receptor during the signal transmission and by confirming the return of the transmitted data from the destination.

Another object of the present invention is to provide an optical communication apparatus comprising a light-emitting element driven by transmission signals supplied from a transmission unit, an optical receptor element for receiving transmitted signals, a reception unit for receiving signals from said optical receptor element, and means for invalidating information received by the reception unit during the transmitting operation of the transmission unit.

Still another object of the present invention is to provide an optical communication process between plural optical communication apparatus each comprising a light-emitting element driven by transmission signals supplied from a transmission unit, an optical receptor element for receiving transmission signals, a reception unit for receiving signals from the optical receptor element, and a display unit, wherein the information transmitted by the transmission unit of a first optical communication apparatus is received by a second optical transmission apparatus and is then returned from the second apparatus to the first apparatus.

Still another object of the present invention is to provide an optical communication apparatus comprising a light-emitting element driven by transmission signals supplied from a transmission unit, an optical receptor element for receiving transmitted signals, a reception unit for receiving signals from the optical receptor element, and re-transmission control means for re-sending signals, received by the reception unit, through the transmission unit and the light-emitting element.

DETAILED DESCRIPTION OF THE PREFERRED EMBODIMENTS

Now the present invention will be explained in greater detail by an embodiment thereof shown in the attached drawings.

Figure 1:
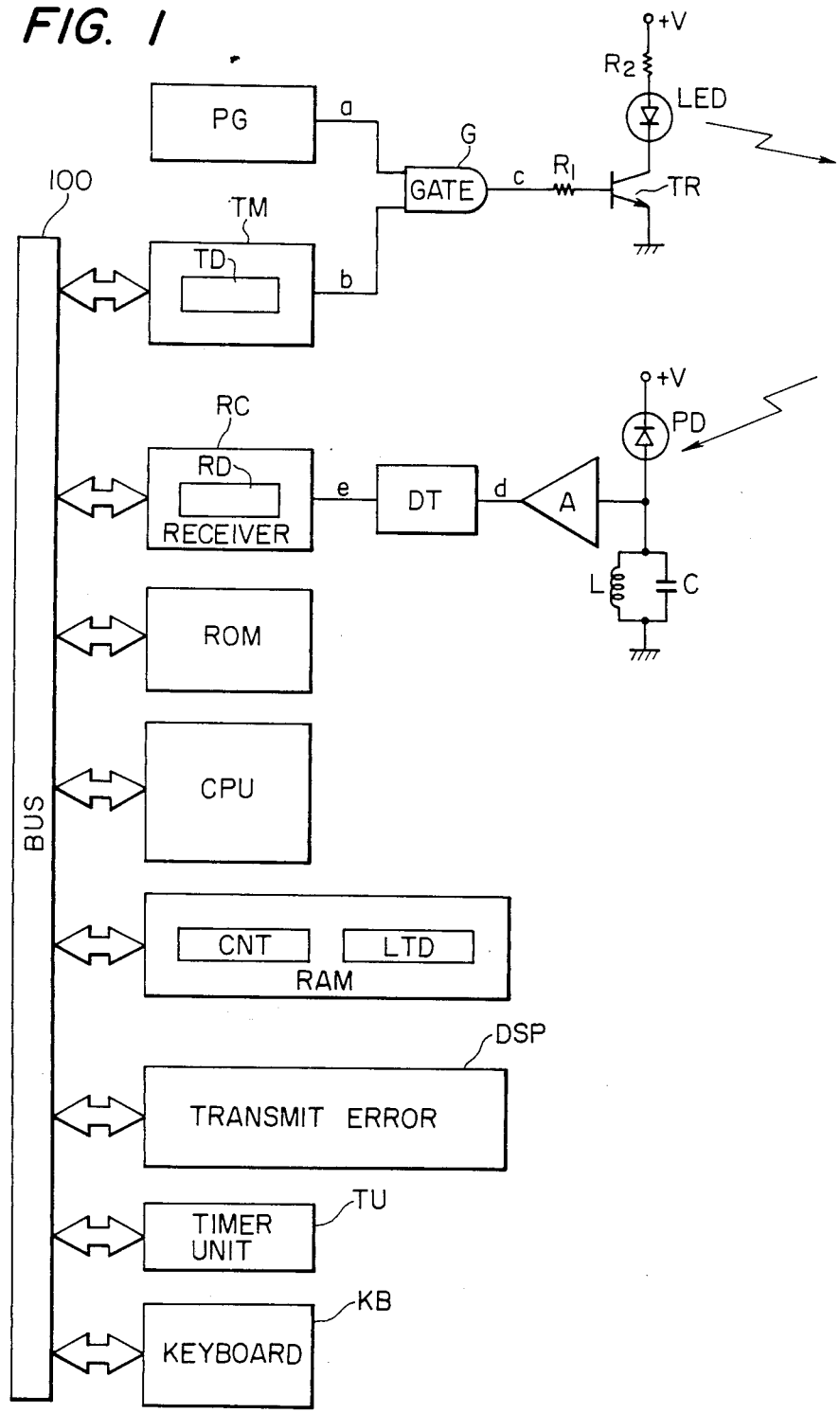
FIG. 1 is a block diagram of an embodiment of the present invention.

At first, reference is made to FIG. 1 showing an embodiment of the present invention in a block diagram, wherein there are shown a keyboard KB for entering data and instructions to a central processing unit CPU; a timer unit TU to be started by the central processing unit CPU and to advise the expiration of a determined time to the central processing unit CPU; a display unit DSP for displaying data supplied from the central processing unit CPU; a random access memory RAM including a 1-byte counter CNT and a transmission buffer memory LTD for storing the data to be transmitted, both defined as areas in a part of the random access memory; a central processing unit CPU for successively executing the instructions stored in a read-only memory ROM in response to instructions from the keyboard KB thereby displaying the result of the data processing on the display unit DSP and controlling the transmission and reception; a read-only memory ROM for storing plural series of instructions corresponding to various commands, a receiving unit RC composed of a circuit for receiving serial data of RS232C standard and incorporating therein a reception data register RD for storing the received data; a transmitting unit TM for releasing signals of RS232C standard, incorporating an 8-bit transmission data register TD for storing signals to be transmitted and adapted to start the transmission when signals are written into the transmission data register; a carrier pulse generator PG for generating pulses as a carrier for the data to be transmitted; an AND gate G for adding the transmission data b supplied from the transmitting unit TM to the carrier pulses a supplied from the carrier pulse generator PG, and releasing an output signal c through a resistor R1 to turn on and off a transistor TR thereby causing light emission into an open area from a light-emitting diode LED a resistor R2 for limiting the current in the light-emitting diode LED, as shown in FIG. 1 a photodiode PD for controlling the current therein in response to the intensity of incoming light from an open area; an inductance L and a condenser C constituting a resonance circuit which becomes resonant only with the signals of a frequency identical with that of the carrier pulses thereby generating a voltage across the inductance L; an amplifier A for amplifying the output signals from the resonance circuit L, C; and a detection circuit DT for removing the carrier signal from the output signal of the amplifier A.

Figure 2:
FIG. 2 is a timing chart showing the function of the transmission unit.
Figure 2:
Figure 2:

Now reference is made to FIG. 2 for explaining the function of the circuit in the transmission. The carrier pulse generates PG continuously generate pulses as shown by (a) in FIG. 2. As an example, in case of transmitting a character "A" in the ASCII code, the central processing unit CPU sends a code for "A", namely #41 in hexadecimal number to the transmission data register TD, whereby the transmitting unit TM adds start bits, parity bits and stop bits according to the standard RS232C, thus releasing an output signal (b) shown in FIG. 2. The output signal (a) from the pulse generator PG and the output signal (b) from the transmission data register TD are supplied to the gate G to obtain an output signal (c) for driving the light-emitting diode LED.

Figure 3:
FIG. 3 is a timing chart showing the function of the reception unit.
Figure 3:
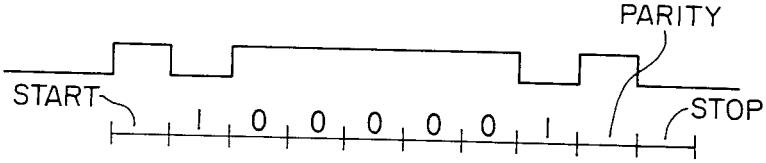

Reference is made to FIG. 3 for explaining the function of the circuit at the reception. The intensity change of the light received by the photodiode PD is processed by the resonance circuit L, C to extract the same frequency component as the frequency of the carrier pulses. Thus, in response to the character "A" transmitted from the aforementioned transmitting unit, the amplifier A provides an output signal (d) shown in FIG. 3, and the detection circuit DT restores the transmitted data as shown by (e) in FIG. 3. The restored signal (e) is received by the receiving unit RC so that the code #41 for the character "A" is stored in the reception data register RD.

Figure 4:
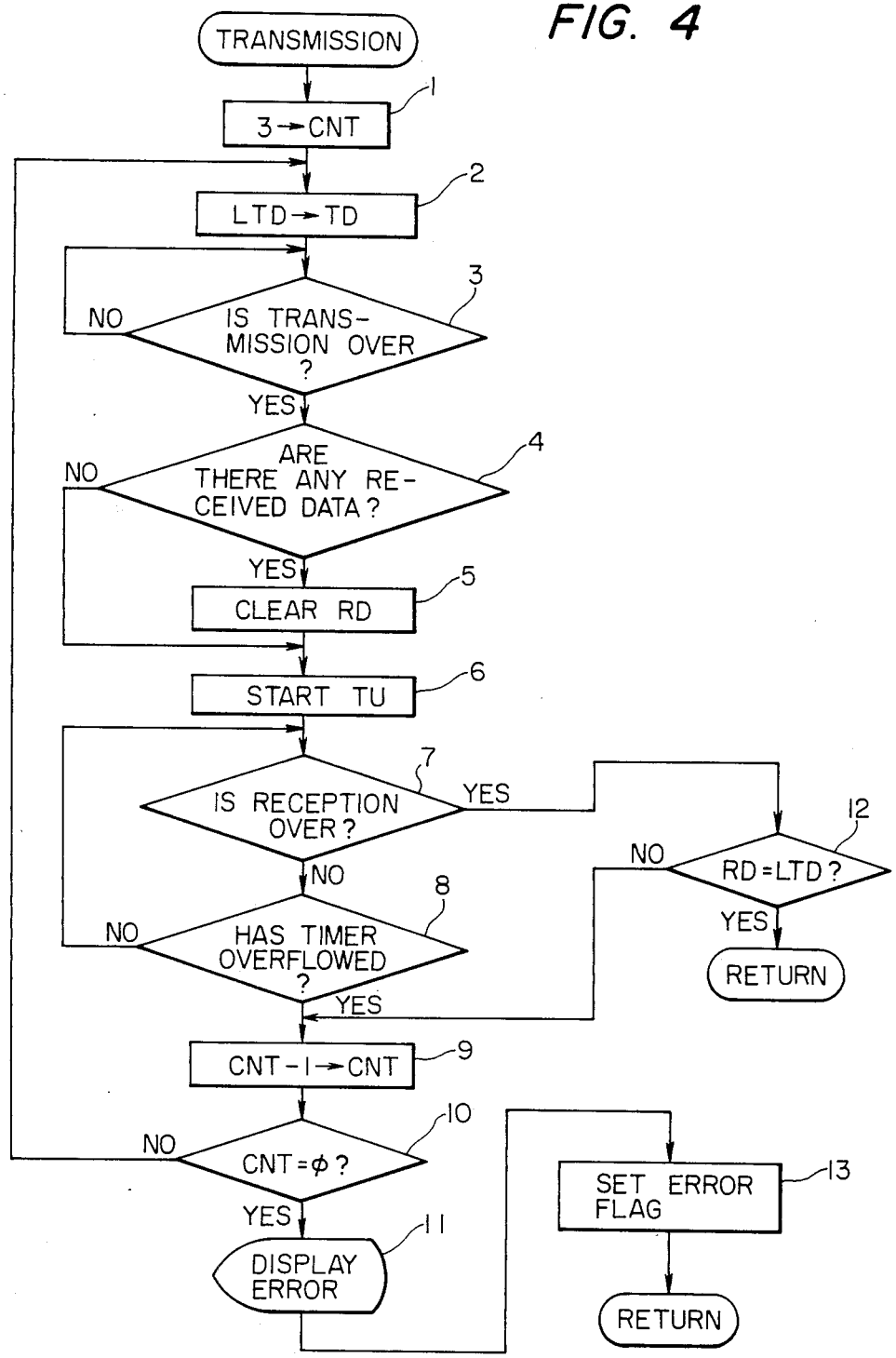
FIG. 4 is a flow chart showing the transmitting procedure.
Figure 5:
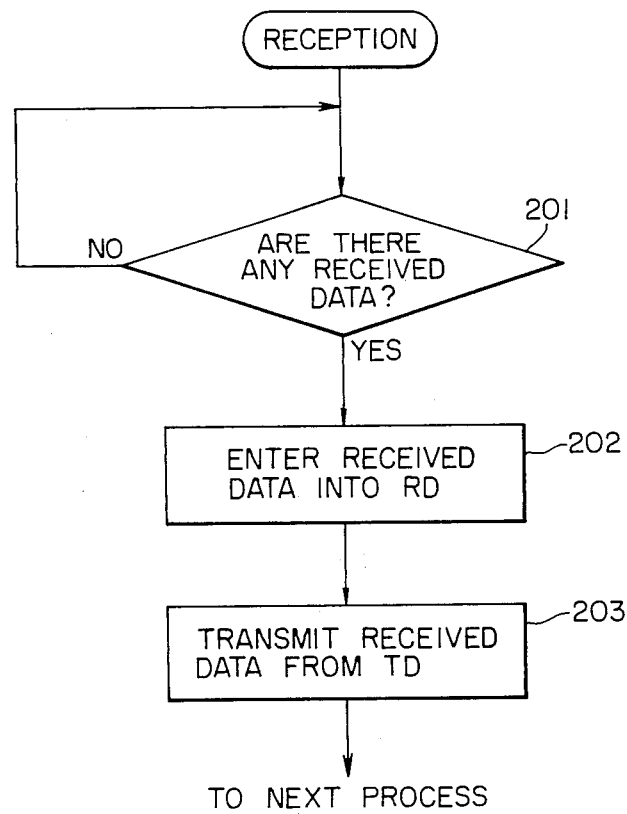
FIG. 5 is a flow chart showing the receiving procedure.

Now reference is made to FIGS. 4 and 5 for explaining the procedure of operations. At first, at the transmitting station, a number of re-transmissions (three times in this case) in the counter CNT in the random access memory RAM (step 1). Then the transmission data in the transmission data buffer LTD of the random access memory RAM are transmitted to the transmission data register TD (step 2), which in turn transmits the data through the light-emitting diode LED (step 3). Upon completion of the transmission, confirmation is made whether any data have been received during the transmission (step 4), and any such data are regarded as the reception of the transmitted data reflected by an obstacle such as a wall and are invalidated (step 5). When the transmitted data are received at the receiving station (step 201), the received data are stored in the reception data register RD (step 202), and are sent back to the transmitting station through the register TD (step 203). At the first transmitting station there is executed a procedure of confirming whether the transmitted data are correctly received by the receiving station and are correctly returned to the transmitting station. At first the timer unit TU is started (step 6), which indicates, to the central processing unit CPU, the lapse of a time required for the receiving station to receive and return the transmitted data and for the transmitting station to receive all such returned data. Then the transmitting station discrimates whether data have been sent from the receiving station (step 7), and, if any, compares the received data with the transmitted data (step 12). The program proceeds to a next step if the two mutually coincide, indicating that the communication has been completed in normal condition. If the determined time of the timer unit TU has expired (step 8) or if the received data are not same as the transmitted data, namely in case of an error in the data transmission, the content of the counter CNT storing the number of re-transmissions in case of a transmission error is reduced by one (step 9), and a discrimination is made whether the re-transmissions of the data have already been made over the determined number of times (step 10). If correct data transmission cannot be achieved even after the re-transmissions of the predetermined number, an error message is displayed in the display DSP as shown in FIG. 1 (step 11) to advise the error status to the operator, and an error flag is set (step 13). In addition to the example of display shown in FIG. 1, there may be employed various other types of display.

As explained in the foregoing, the present invention avoids errors resulting from the light reflected by an obstacle such as a wall and received by the receiving unit and to confirm secure data transmission by returning the received data to the transmitting station from the destination, thereby ensuring communication through an unstable optical path.

What I claim is:

1. An optical communication apparatus comprising:
   a transmission unit having a light emitting element for transmitting a light signal containing information into an open area;
   an optical receptor element for receiving a light signal containing information from the open area;
   a reception unit including a detection circuit for receiving from said optical receptor element a data signal containing the information in the received light signal;
   memory means for storing information contained in the received light signal;
   comparing means for comparing the information in the light signal provided by said transmission unit of a first communication apparatus with the information in a light signal received by said optical receptor element from a second optical communication apparatus;
   control means responsive to said comparing means for re-transmitting information in the data signal, received by said reception unit and stored in said memory means, by means of said transmission unit and said light-emitting element; and
   counter means for counting the number of re-transmissions made by said transmission unit, said counter means cooperating with said control means to limit the number of re-transmissions of the information in the data signal.

2. An optical communication apparatus according to claim 1, further comprising display means for displaying the result obtained from said comparing means.

3. An optical communication apparatus comprising:
   a transmission unit having a light emitting element for transmitting a light signal containing information into an open area;
   an optical receptor element for receiving a light signal containing information from the open area.
   a reception unit including a detection circuit for receiving from said optical receptor element a data signal containing the information in the received light signal, said reception unit including memory means for storing the information in the data signal;
   comparing means for comparing the information in the light signal provided by said transmission unit of a first communication apparatus with the information in a light signal received by said optical receptor element from a second optical communication apparatus;
   control means responsive to said comparing means for re-transmitting information in the data signal, received by said reception unit and stored in said memory means, by means of said transmission unit and said light-emitting element; and
   counter means for counting the number of re-transmissions made by said transmission unit, said counter means cooperating with said control means to limit the number of re-transmissions of the information in the data signal.

4. An optical communication apparatus according to claim 3, further comprising visualizing means for visualizing the result obtained from said comparing means.

* * * * *